US009415901B2

(12) United States Patent
Beckman et al.

(10) Patent No.: US 9,415,901 B2
(45) Date of Patent: Aug. 16, 2016

(54) FOLDABLE HANDLE FOR A COOK-POT

(71) Applicant: Pacific Market International, LLC, Seattle, WA (US)

(72) Inventors: Michael Carl Beckman, Seattle, WA (US); Andrew C. F. Wahl, Seattle, WA (US); Evan M. Choltco-Devlin, Seattle, WA (US)

(73) Assignee: PACIFIC MARKET INTERNATIONAL, LLC, Seattle, WA (US)

( * ) Notice: Subject to any disclaimer, the term of this patent is extended or adjusted under 35 U.S.C. 154(b) by 8 days.

(21) Appl. No.: 14/336,952

(22) Filed: Jul. 21, 2014

(65) Prior Publication Data

US 2016/0015202 A1 Jan. 21, 2016

(51) Int. Cl.

*B65D 25/28* (2006.01)
*A47J 33/00* (2006.01)
*A47J 45/06* (2006.01)

(52) U.S. Cl.

CPC ................ *B65D 25/28* (2013.01); *A47J 33/00* (2013.01); *A47J 45/067* (2013.01); *B65D 2525/288* (2013.01)

(58) Field of Classification Search

CPC ............... B65D 25/28; B65D 25/2835; B65D 25/2838; B65D 25/2844; B65D 25/2852; B65D 2525/286; B65D 2525/288; B65D 25/2841; B65D 2525/287; A47J 27/002; A47J 45/067; A47J 45/07; A47J 45/061; A47J 45/06; A47J 45/02; A47J 33/00

USPC ......... 220/752, 761, 762, 763, 764, 766, 765, 220/912, 573.1, 710.5; 215/396; 206/547, 206/549

See application file for complete search history.

(56) References Cited

U.S. PATENT DOCUMENTS

| | | | | |
|---|---|---|---|---|
| 1,490,568 A * | 4/1924 | Koenig | ................. | A47J 45/061 16/429 |
| 2,364,073 A | 12/1944 | Howard | | |
| 2,444,447 A * | 7/1948 | Josselyn | ................... | A45F 3/16 16/110.1 |
| 2,460,840 A * | 2/1949 | Mockabee | ......... | B65D 25/2844 16/110.1 |
| 2,841,814 A * | 7/1958 | Murphy | ................ | A47J 45/061 220/212.5 |
| 3,812,997 A | 5/1974 | McNally | | |
| 4,585,134 A * | 4/1986 | Miyaji | ................ | A47J 41/0083 190/115 |
| 6,446,988 B1 | 9/2002 | Kho | | |
| 6,485,438 B1 * | 11/2002 | Minue | .................. | A61B 10/007 600/573 |
| 7,975,874 B2 * | 7/2011 | Scott | ..................... | A47J 45/071 16/425 |
| D662,761 S | 7/2012 | Wahl | | |
| 8,590,108 B2 * | 11/2013 | Baik | ....................... | G06F 1/181 16/419 |

FOREIGN PATENT DOCUMENTS

| | | |
|---|---|---|
| FR | 2712257 | 5/1995 |

* cited by examiner

*Primary Examiner* — Fenn Mathew
*Assistant Examiner* — Robert Stodola
(74) *Attorney, Agent, or Firm* — George C. Rondeau, Jr.; Davis Wright Tremaine LLP

(57) ABSTRACT

A foldable handle for a cook-pot including a bracket attached to the cook-pot, a handle member, a lock member and a bracing link member. The handle member has an upper end portion pivotally connected to the bracket, and opposed first and second sidewalls, each with an upper opening located in the upper end portion of the handle member and a lower opening located in a lower end portion of the handle member. The handle member has a guide channel with a lock member slidably disposed therein for movement between the upper and lower end portions of the handle member. First and second resiliently flexible members each having a projection for removably fitting within corresponding upper and lower openings of the first and second sidewalls. The link member has a first end rotatable retained by the bracket, and a second end rotatably attached to the lock member.

24 Claims, 7 Drawing Sheets

FOLDABLE HANDLE FOR A COOK-POT

BACKGROUND OF THE INVENTION

1. Field of the Invention

The present invention is directed generally to a foldable handle for a cook-pot, or other style pot or container, particularly a cook-pot for use by backpackers or other users needing to prepare food or heated beverages with minimal supplies.

2. Description of the Related Art

Unfortunately, conventional approaches involve either cook-pots with fixed handles, which are bulky and awkward to pack, particularly when space is limited such as in a backpacking situation, or cook-pots with removable handles, which are more easily packed, but the separate handle can easily be lost or damaged, making continued safe use of the cook-pot impossible.

Thus, what is needed is a handle for a cook-pot that is permanently affixed thereto, but is movable between an opened position, where the handle can be used to safely manipulate the cook-pot, for example when the cook-pot is heated from cooking, and a closed position, where the cross-sectional area of the cook-pot and handle are minimized for easy packing and storage.

BRIEF DESCRIPTION OF THE SEVERAL VIEWS OF THE DRAWING(S)

DETAILED DESCRIPTION OF THE INVENTION

This detailed description discusses an illustrative embodiment of an inventive concept, specifically a foldable handle for a cook-pot and other style pots and containers, with reference to the accompanying drawings. This detailed description is provided to give persons having ordinary skill in the relevant art a full, clear, concise, and exact description of the inventive concept, and to enable such a person to appreciate and understand how to make and use, not only the described illustrative embodiments of the conceptual foldable handle for a cook-pot explicitly described below, but also all of the various other embodiments that fall within the scope of the inventive concept, despite those embodiments not being explicitly described below.

Among the several advantages of the present foldable handle for a cook-pot, as will be discussed in greater detail herein, is that, when the cook-pot is not in use, the handle can be selectively locked in a closed, or folded, position, wherein the length of the handle substantially rests against or in close proximity to the sidewall of the cook-pot, thereby minimizing the cross-sectional area of the cook-pot. When a user desires to use the cook-pot, the handle can be selectively unlocked and moved to an opened, or unfolded, position, wherein the handle is rotated relative to the cook-pot, a such that the length of the handle extends transversely away from the body of the cook-pot, thereby allowing the cook-pot and any contents, to be heated while providing a safe and convenient way for a user to handle the cook-pot.

Figure 1:
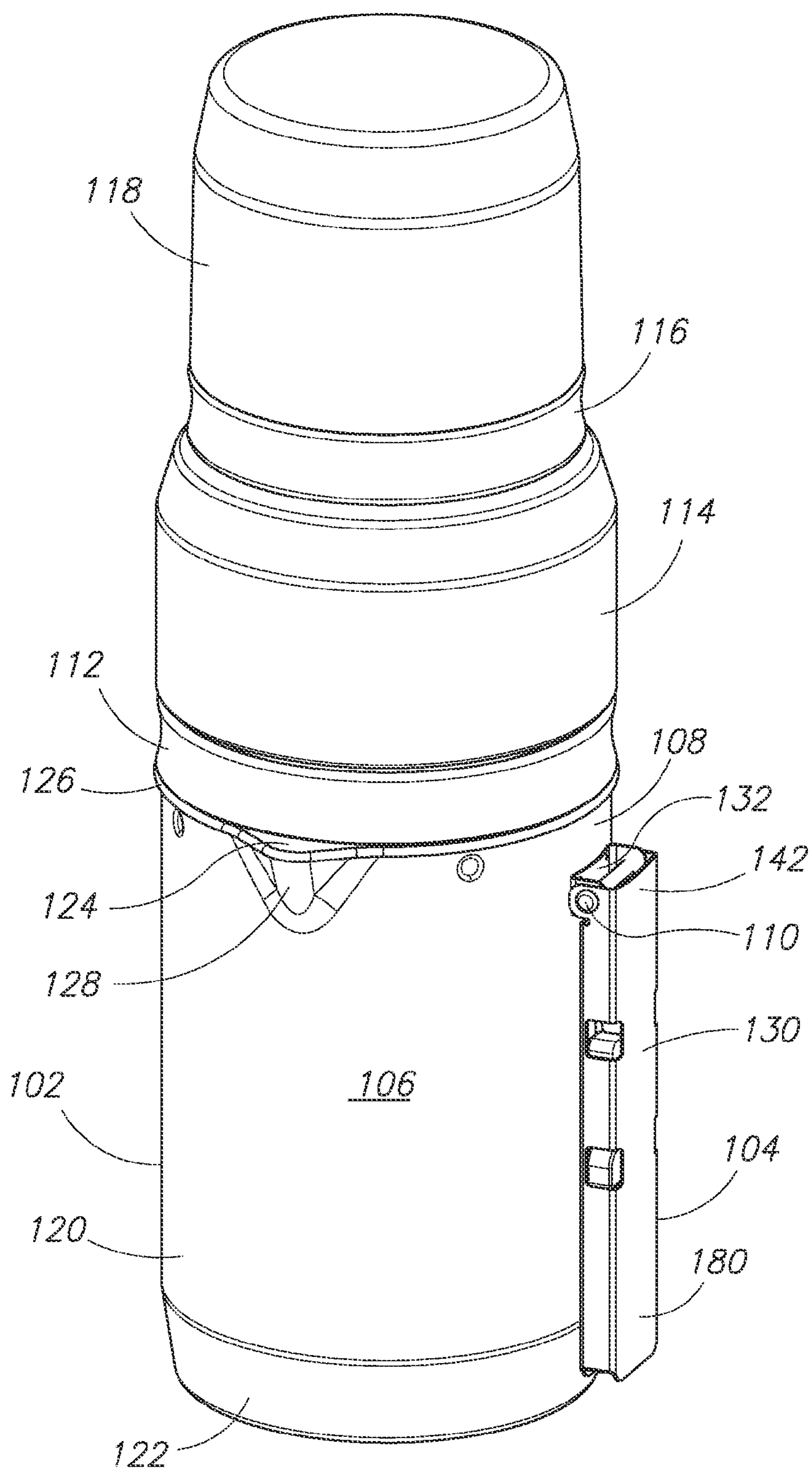
FIG. 1 is perspective view of a combination backpacking food/drink device including a cook-pot having a foldable handle embodying certain aspects of the present invention.
Figure 5:
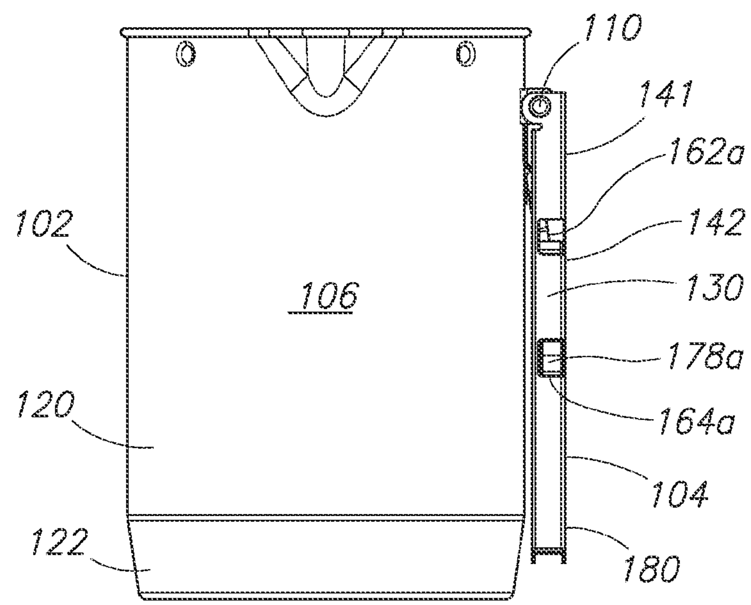
FIG. 5 is a front elevational view of the cook-pot of FIG. 1 with the foldable handle in the closed position.
Figure 6:
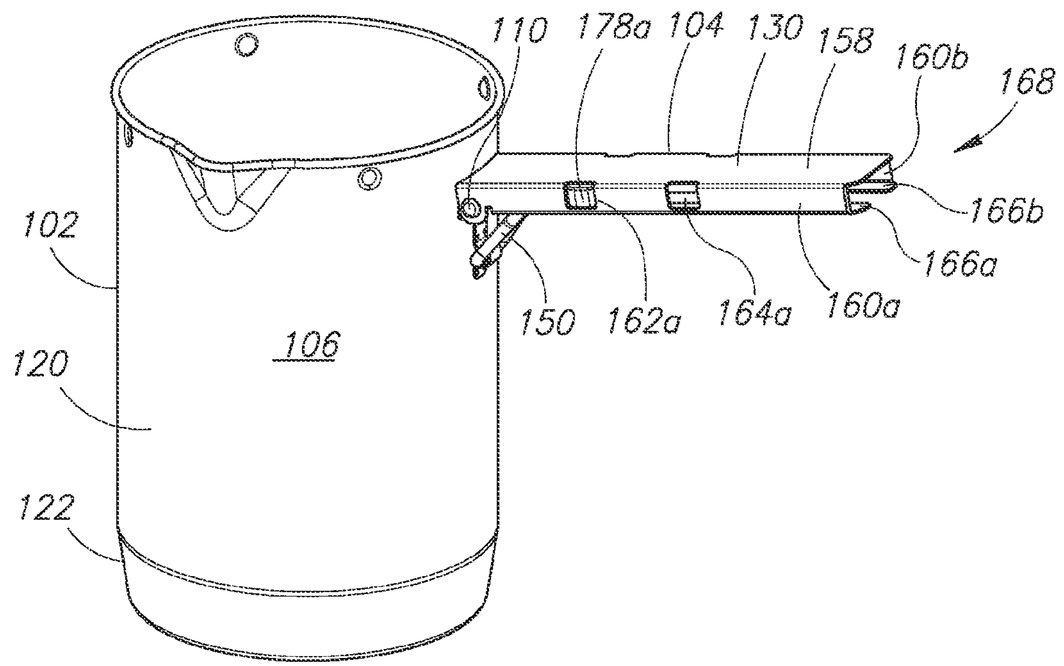
FIG. 6 is a front perspective view of the cook-pot of FIG. 1 with the foldable handle in an opened position.
Figure 7:
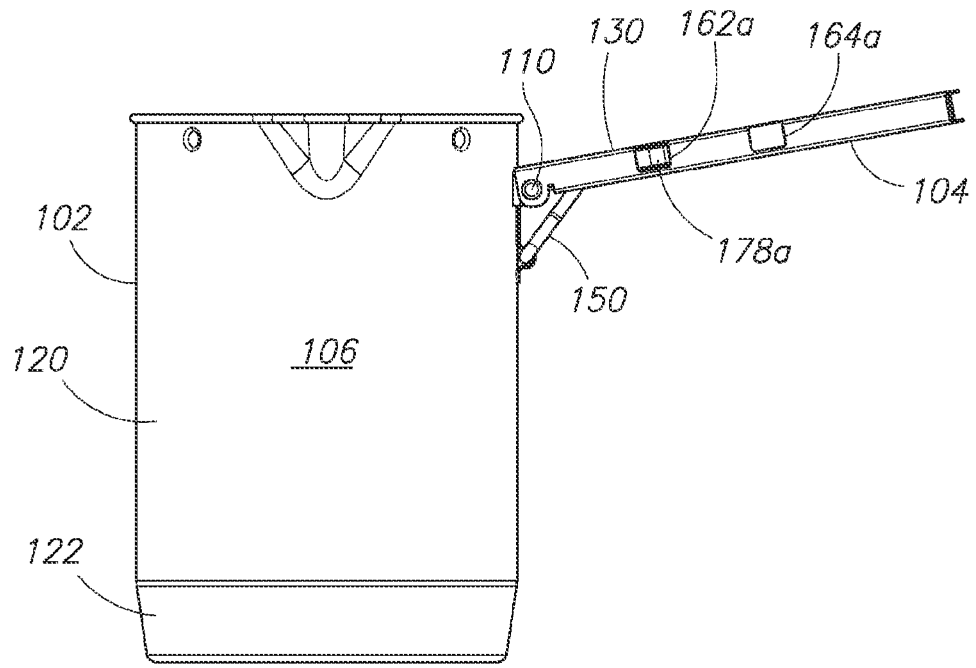
FIG. 7 is a front elevational view of the cook-pot of FIG. 1 with the foldable handle in the opened position.
Figure 8:
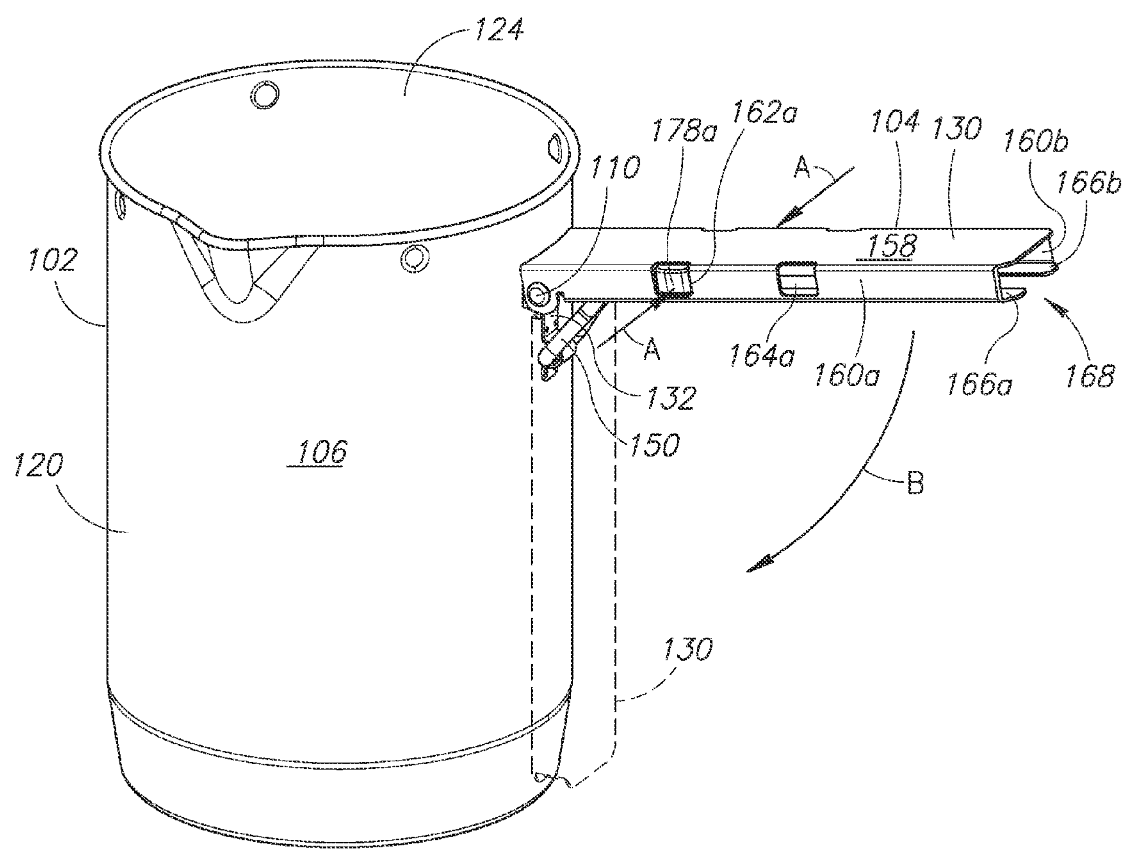
FIG. 8 is a front perspective view of the cook-pot of FIG. 1 with the foldable handle in the opened position and with the foldable handle shown in broken line in the closed position.
Figure 9:
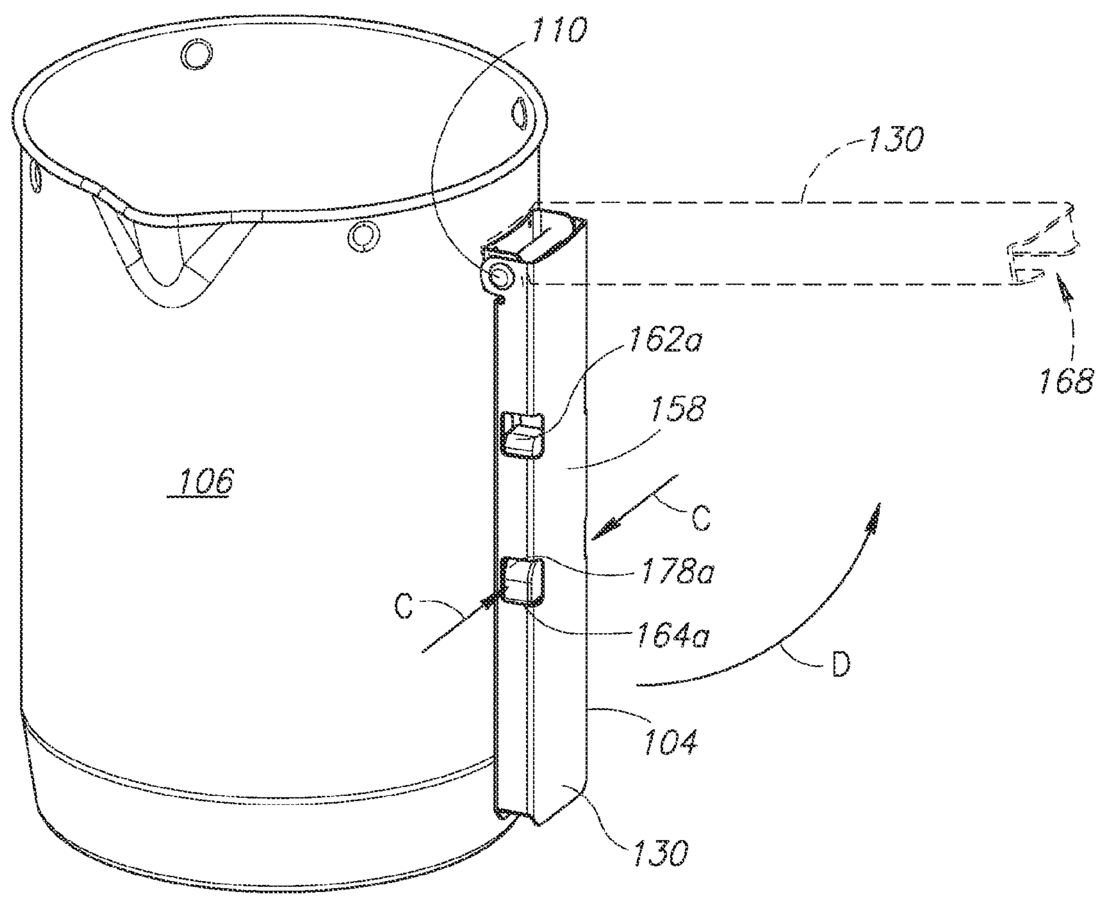
FIG. 9 is a perspective view of the cook-pot of FIG. 1 with the foldable handle in the closed position and with the foldable handle shown in broken line in the opened position.

Turning now to the specific described embodiment, FIG. 1 illustrates a non-limiting, exemplary foldable handle for a combination backpacking food/drink device 100 having a cook-pot 102. As is described in more detail below, the cook-pot 102 includes a foldable handle 104 rotatably affixed to a body 106 of the cook-pot, preferably near an open upper end 108 of the body. The foldable handle 104 is configured to be selectively movable by limited rotation around a central axis of a pivot pin 110, between a closed position, as illustrated in FIGS. 1, 3, 4, 5 and 9, and an opened position, as illustrated in FIGS. 6, 7 and 8.

The combination backpacking food/drink device 100, when fully assembled, includes the cook-pot 102 at the bottom of the assembly with a coffee/tea press basket 112 removably positioned within the body 106 of the cook-pot and extending upwardly out of the upper end 108 of the cook-pot, and a vacuum bottle 114 removably positioned within the press 112 and extending upwardly out of the press. The vacuum bottle 114 includes at its upper end a removable inner cup 116 and a removable outer cup 118.

The body 106 of the cook-pot 102 includes a generally cylindrical exterior sidewall 120 with a cylindrical central axis 121 (see FIG. 2), a thermally conductive base 122 and an upper opening 124. The upper opening 124 is defined by a lip 126 and a pouring spout 128 for facilitating emptying the cook-pot, e.g., by pouring its contents into another container, such as the vacuum bottle 114, the inner cup 116, and/or the outer cup 118.

Figure 2:
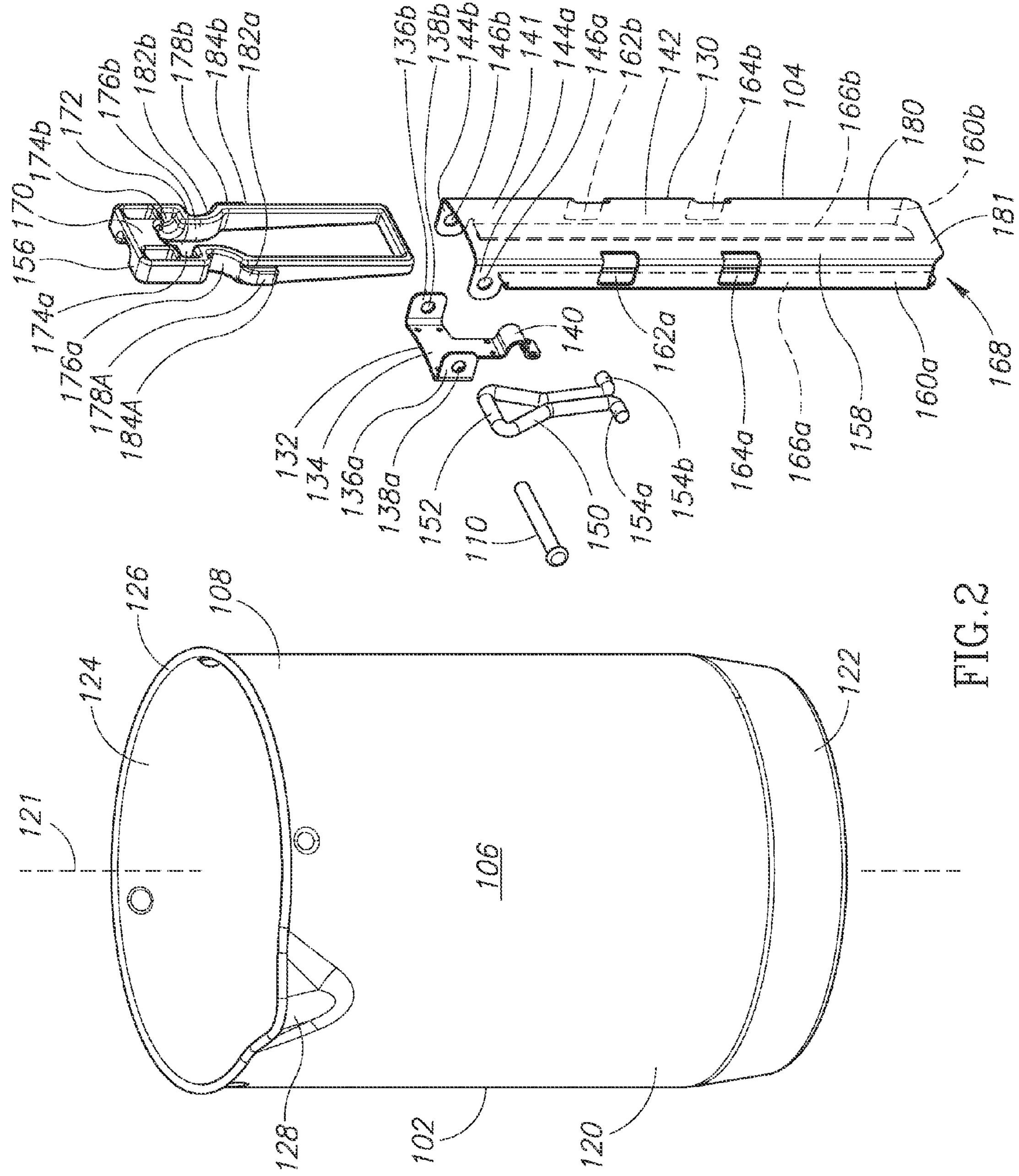
FIG. 2 is an exploded perspective view of the cook-pot of FIG. 1.
Figure 3:
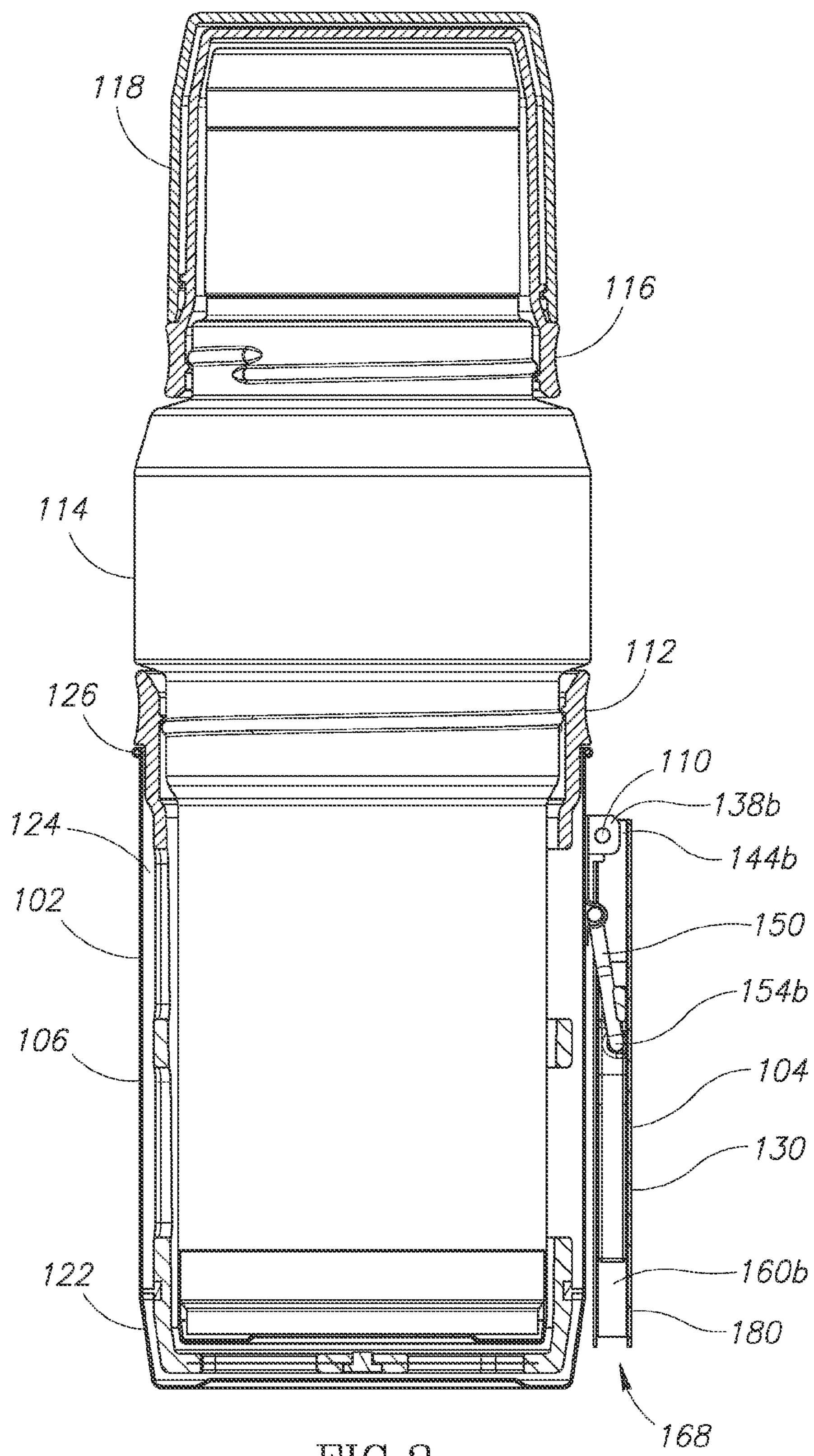
FIG. 3 is a partial cross-sectional view of the combination backpacking food/drink device of FIG. 1.
Figure 4:
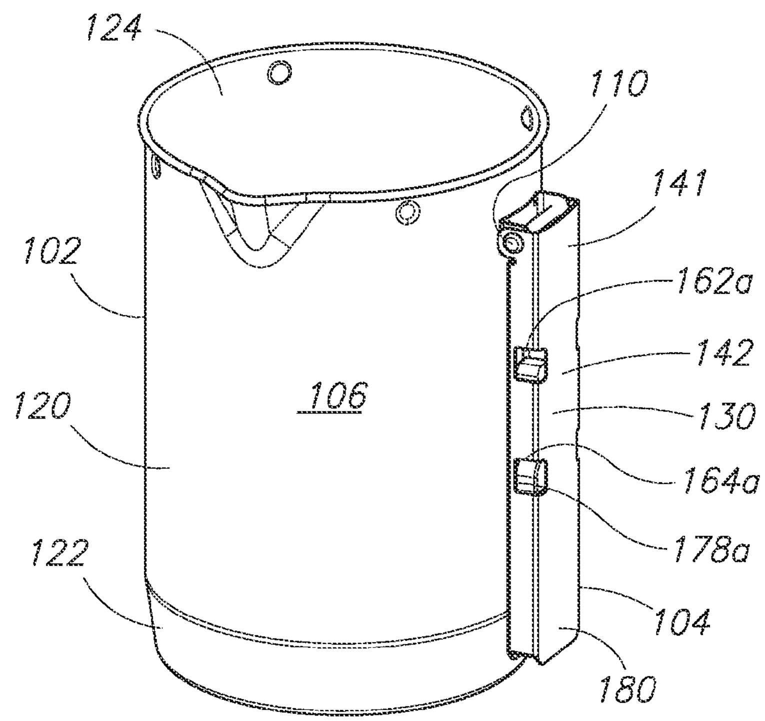
FIG. 4 is a front perspective view of the cook-pot of FIG. 1 with the foldable handle in a closed position.

FIG. 2 illustrates a non-limiting, exemplary embodiment of the foldable handle 104 of the cook-pot 102. In this embodiment, the foldable handle 104 includes a handle member 130 rotatably affixed to the body 106 of the cook-pot 102 via a bracket 132, which is conventionally affixed to the exterior sidewall 120 of the cook-pot, for example via spot welding or adhesive. The bracket 132 includes a base plate 134 with opposing, outwardly projecting tabs **136*a* and 136*b*, with each of the tabs 136*a* and 136*b* having a hole 138*a* and 138*b*, respectively. Arching outward away from the base plate 134 is an arcuate member 140. The handle member 130 at an upper end 141 of an upper end portion 142 thereof has opposing, inwardly projecting tabs 144*a* and 144*b*, with each of the tabs 144*a* and 144*b* having a hole 146*a* and 146*b*, respectively. The tabs 144*a* and 144*b* are spaced apart so as to be positioned with the tab 144*a* adjacent the tab 136*a* of the bracket 132 with the holes 138*a* and 146*a* in alignment, and with the tab 144*b* adjacent to the tab 136*b* of the bracket 132 with the holes 138*b* and 146*b* in alignment. With the tabs so positioned the pivot pin 110 projects through the holes of the tabs 136*a*, 136*b*, 144*a* and 144*b* and pivotally attaches the handle member 130 to the bracket 132, which as noted is affixed to the exterior sidewall 120 of the cook-pot 102. The handle member 130 is pivotally attached to the body 106 of the cook-pot 102 for rotation through a rotational plane which contains the cylindrical central axis 121 of the exterior sidewall 120 of the body 106 of the cook-pot 102, and when in the closed position the handle member is positioned for storage along the cylindrical exterior sidewall, tangential to the cylindrical exterior sidewall while remaining in the rotational plane containing the central axis of the exterior sidewall. When rotated between the opened and closed positions the handle member 130** remains in the rotational plane.

A bracing link member 150 has a pivot bar 152 at an upper end portion thereof positioned within the interior of the arcuate member 140 of the bracket 132, between the arcuate member and the exterior sidewall 120 of the cook-pot 102 (as best shown in FIGS. 6 and 7). The bracing link member 150 has a pair of bracing arms 154*a* and 154*b* at a lower end portion thereof for rotatable engagement with a sliding lock member 156, as is described below.

The handle member 130 has an outward wall 158 and opposing left and right sidewalls 160*a* and 160*b*, respectively, projecting perpendicularly inward from the left and right side edges, respectively, of the outward wall. The left sidewall 160*a* has an upper locking aperture 162*a* and a lower locking aperture 164*a* therein, and the right sidewall 160*b* has an upper locking aperture 162*b* and a lower locking aperture 164*b* therein. The upper locking apertures 162*a* and 162*b* and the lower locking apertures 164*a* and 164*b* extend partially across the face of the outward wall 158 of the handle member 130. Each of the left and right sidewalls 160*a* and 160*b* has a guide rail 166*a* and 166*b*, respectively, projecting laterally inward from the inward edge of the respective left and right sidewall toward the opposing guide rail. The guide rails 166*a* and 166*b* are arrange generally parallel to the outward wall 158, and define a guide channel 168 within the handle member 130, on the inward side of the outward wall, which slidably receives the sliding lock member 156.

The sliding lock member 156 is slidably disposed within the guide channel 168 and is dimensioned to be slidably movable along substantially the length of the guide channel. The sliding lock member 156 is formed with an upper body portion 170 having at a lower end a central cavity 172 defined by left and right interior walls, with left and right side recesses 174*a* and 174*b*, respectively, therein. The left side recess 174*a* rotatably receives and retains the bracing arm 154*a* therein, and the right side recess 174*b* rotatably receives and retains the bracing arm 154*b* therein. The width of upper body portion 170 is preferably substantially equal to or slightly less than the width of the guide channel 168.

The sliding lock member 156 further includes left and right side arms 176*a* and 176*b* projecting downward from the upper body portion 170, and are joined at their lower ends. The includes left and right side arms 176*a* and 176*b* having laterally outward projecting tabs 178*a* and 178*b*, respectively, and are resiliently flexible in the laterally inward and outward directions relative to a longitudinal axis of upper body portion 170.

The left and right side arms 176*a* and 176*b* and their tabs 178*a* and 178*b* are sized so that the tabs 178*a* and 178*b* will flex laterally outward and be removably positioned within the upper locking apertures 162*a* and 162*b*, respectively, when the sliding lock member 156 is slid within the guide channel 168 to the upper end portion 142 of the handle member 130 to position the tabs 178*a* and 178*b* at the location of the upper locking apertures 162*a* and 162*b*. The bracing link member 150 has a length such that when the sliding lock member 156 is so positioned, with the tabs 178*a* and 178*b* positioned within the upper locking apertures 162*a* and 162*b*, and with the sliding lock member releasably locked in that position against further sliding along the guide channel 168, the foldable handle 104 is in the opened position shown in FIGS. 6, 7 and 8, with the handle member 130 essentially projecting transversely away from the sidewall 120 of the body 106 of the cook-pot 102. In the illustrated embodiment the angle is somewhat greater than 90 degrees relative to the cylindrical central axis 121 of the exterior sidewall 120 of the body 106, as best seen in FIG. 7.

The sliding lock member 156 is releasable from this position by a user simultaneously manually pressing the tabs 178*a* and 178*b* laterally inward (as shown by arrows "A" in FIG. 8) sufficiently so that a downward rotational force applied to the handle member 130 will allow the sliding lock member 156 to slide within the guide channel 168 to a lower end portion 180 of the handle member. As such movement occurs, the handle member 130 is rotated downward about the pivot pin 110 toward the sidewall 120 of the body 106, as shown by arrow "B" in FIG. 8. The lower end portion 180 of the handle member 130 includes a free end 181 disconnected from the body 106 of the cook-pot 102.

Similarly, the left and right side arms 176*a* and 176*b* and their tabs 178*a* and 178*b* are sized so that the tabs 178*a* and 178*b* will flex laterally outward and be removably positioned within the lower locking apertures 164*a* and 164*b*, respectively, when the sliding lock member 156 is slid within the guide channel 168 to the lower end portion 180 of the handle member 130 to position the tabs 178*a* and 178*b* at the location of the lower locking apertures 164*a* and 164*b*. The length of the bracing link member 150 is such that when the sliding lock member 156 is so positioned, with the tabs 178*a* and 178*b* within the lower locking apertures 164*a* and 164*b*, and with the sliding lock member releasably locked in that position against further sliding along the guide channel 168, the foldable handle 104 is in the closed position shown in FIGS. 1, 3, 4, 5 and 9, with the handle member 130 essentially immediately adjacent to the sidewall 120 of the body 106 of the cook-pot 102, which in the illustrated embodiment is at approximately 0 degrees relative to the body, as best seen in FIG. 5.

The sliding lock member 156 is releasable from this position by a user simultaneously manually pressing the tabs 178*a* and 178*b* laterally inward (as shown by arrows "C" in FIG. 9) sufficiently so that an upward rotational force applied to the handle member 130 will allow the sliding lock member 156 to slide within the guide channel 168 to the upper end portion 142 of the handle member. As such movement occurs, the handle member 130 is rotated upward about the pivot pin 110 away from the sidewall 120 of the body 106, as shown by arrow "D" in FIG. 9.

The tabs 178*a* and 178*b* have gradually sloped camming surfaces at their upper end portions 182*a* and 182*b*, respectively, which engage the upper end walls of the lower locking apertures 164*a* and 164*b* to reduces the upward rotational force necessary to rotate the handle member 130 about the pivot pin 110 should the user not press laterally inward sufficiently to cause the tabs 178*a* and 178*b* to be fully extracted from within the lower locking apertures 164*a* and 164*b*. The tabs 178*a* and 178*b* have more steeply sloped camming surfaces at their lower end portions 184*a* and 184*b*, respectively, which engage the lower end walls of the upper locking apertures 162*a* and 162*b* to reduces the downward rotational force necessary to rotate the handle member 130 about the pivot pin 110 should the user not press laterally inward sufficiently to cause the tabs 178*a* and 178*b* to be fully extracted from within the upper locking apertures 162*a* and 162*b*.

The upper locking apertures 162*a* and 162*b* and the lower locking apertures 164*a* and 164*b* extend partially across the face of the outward wall 158 of the handle member 130 to permit the user to simultaneously manually pressing the tabs 178*a* and 178*b* farther laterally inward than otherwise would be possible if the apertures were only in the left and right sidewalls 160*a* and 160*b* and did not extend at least partially across the face of the outward wall 158 of the handle.

It is noted that when the sliding lock member 156 is positioned with the tabs 178*a* and 178*b* within the upper locking apertures 162*a* and 162*b*, significant further upward rotation of the handle member 130 is not possible since the upper end of the upper end portion of the handle member is in engagement with the sidewall 120 of the body 106 of the cook-pot 102, which serves as a stop limit.

The foldable handle 104, as described above, can be easily and quickly transitioned between the opened and closed position, and when in the closed position does not add significantly to the cross-sectional area of the cook-pot 102. Further, the sliding lock member 156 slidably disposed within the guide channel 168 and using the tabs 178*a* and 178*b* releasably positionable within the upper locking apertures 162*a* and 162*b* or the lower locking apertures 164*a* and 164*b* to releasable lock the foldable handle in opened or closed position as desired, provides a useful and safe handle construction for use with cook-pots and other styles of pots and containers.

While this detailed description describes various examples, aspects, and embodiments of the conceptual foldable handle for a cook-pot and other style pots and containers, it does not act to define or otherwise limit the scope of the concept itself. It is the exclusive function of the claims which follow this description to particularly point out the metes and bounds of the present concept. Accordingly, this description is not intended, and should not be read by a person having ordinary skill in the art, to limit the scope of the conceptual foldable handle as defined by the claims, nor imply any preference of the described embodiments over any other embodiment, unless such a limitation or preference is explicitly identified herein.

Accordingly, the invention is not limited except as by the appended claims.

The invention claimed is:

1. A foldable handle for a cook-pot having a generally cylindrical sidewall with a central axis, comprising:

a bracket fixedly attachable to the sidewall of the cook-pot;

an elongated non-articulated handle member having an upper end portion directly pivotally connected to a first portion of the bracket for rotation about a first rotational axis through a rotation plane containing the central axis of the cook-pot and a lower end portion disconnected from the sidewall of the cook-pot, the handle member having opposed first and second elongated sidewalls, each of the first and second sidewalls including an upper opening located in the upper end portion of the handle member and a lower opening located in the lower end portion of the handle member, the handle member having a longitudinally extending guide channel therein between the first and second sidewalls and extending between the upper and lower end portions of the handle member;

a lock member slidably disposed in the guide channel for movement between the upper and lower end portions of the handle member, the lock member including a first resiliently flexible member having a projection for removably fitting within the upper and lower openings of the first sidewall when in position thereat, and a second resiliently flexible member having a projection for removably fitting within the upper and lower openings of the second sidewall when in position thereat; and a bracing link member having a first end rotatably retained by a second portion of the bracket located below and spaced apart from the first portion of the bracket for rotation about a second rotational axis located below and spaced apart from the first rotational axis, and a second end rotatably attached to the lock member, the bracing link member having a length to hold the handle member in an opened position within the rotation plane and extending transverse to the cook-pot when the projection of the first flexible member is within the upper opening of the first sidewall and the projection of the second flexible member is within the upper opening of the second sidewall, and to hold the handle member in a closed position within the rotation plane and immediately adjacent to a cylindrical sidewall portion of the sidewall of the cook-pot when the projection of the first flexible member is within the lower opening of the first sidewall and the projection of the second flexible member is within the lower opening of the second sidewall.

2. The foldable handle of claim 1 wherein the second end of the bracing link member includes first and second bracing members, the first bracing member being rotatably attached to the first resiliently flexible member and the second bracing member being rotatably attached to the second resiliently flexible member.

3. The foldable handle of claim 1 wherein the handle member has an inward wall facing toward the sidewall of the cook-pot when the bracket is attached to the sidewall of the cook-pot, the inward wall having an elongated handle member opening extending between the upper and lower end portions of the handle member, the bracing link member extending through the elongated handle member opening and into the guide channel wherein the second end of the bracing link member is rotatably attached to the lock member.

4. A foldable handle for a cook-pot having a generally cylindrical cook-pot sidewall with a central axis, comprising:

an elongated non-articulated handle member having an upper end portion directly pivotally connectable to the cook-pot sidewall at a first cook-pot sidewall location for rotation about a first rotational axis through a rotation plane containing the central axis of the cook-pot and a lower end portion disconnected from the cook-pot sidewall, the handle member having opposed first and second elongated sidewalls, each of the first and second sidewalls including an upper opening located in the upper end portion of the handle member and a lower opening located in the lower end portion of the handle member, the handle member having a longitudinally extending guide channel therein between the first and second sidewalls and extending between the upper and lower end portions of the handle member;

a lock member slidably disposed in the guide channel for movement between the upper and lower end portions of the handle member, the lock member including a first resiliently flexible member having a projection for removably fitting within the upper and lower openings of the first sidewall when in position thereat, and a second resiliently flexible member having a projection for removably fitting within the upper and lower openings of the second sidewall when in position thereat; and a bracing link member having a first end pivotably connectable to the cook-pot sidewall at a second cook-pot sidewall location below and spaced apart from the first cook-pot sidewall location for rotation about a second rotational axis located below and spaced apart from the first rotational axis, and a second end rotatably attached to the lock member, the bracing link member having a length to hold the handle member in an opened position within the rotation plane and extending transverse to the cook-pot when the projection of the first flexible member is within the upper opening of the first sidewall and the projection of the second flexible member is within the upper opening of the second sidewall, and to hold the handle member in a closed position within the rotation plane and immediately adjacent to the cook-pot when the projection of the first flexible member is within the lower opening of the first sidewall and the projection of the second flexible member is within the lower opening of the second sidewall.

5. The foldable handle of claim 4 wherein the second end of the bracing link member includes first and second bracing members, the first bracing member being rotatably attached to the first resiliently flexible member and the second bracing member being rotatably attached to the second resiliently flexible member.

6. The foldable handle of claim 4 wherein the handle member has an inward wall facing toward the cook-pot sidewall when the upper end portion of the handle member is connected to the cook-pot sidewall, the inward wall having an elongated handle member opening extending between the upper and lower end portions of the handle member, the bracing link member extending through the elongated handle member opening and into the guide channel wherein the second end of the bracing link member is rotatably attached to the lock member.

7. A cook-pot having a foldable handle, comprising:

a pot portion having a sidewall;

a bracket attached to the sidewall of the pot portion;

an elongated non-articulated handle member having an upper end portion pivotally connected to a first portion of the bracket for rotation about a first rotational axis and a lower end portion disconnected from the sidewall of the cook-pot, the handle member having opposed first and second elongated sidewalls, each of the first and second sidewalls including an upper opening located in the upper end portion of the handle member and a lower opening located in the lower end portion of the handle member, the handle member having a longitudinally extending guide channel therein between the first and second sidewalls and extending between the upper and lower end portions of the handle member;

a lock member slidably disposed in the guide channel for movement between the upper and lower end portions of the handle member, the lock member including a first resiliently flexible member having a projection for removably fitting within the upper and lower openings of the first sidewall when in position thereat, and a second resiliently flexible member having a projection for removably fitting within the upper and lower openings of the second sidewall when in position thereat; and a bracing link member having a first end rotatably retained by a second portion of the bracket located below and spaced apart from the first portion of the bracket for rotation about a second rotational axis located below and spaced apart from the first rotational axis, and a second end rotatably attached to the lock member, the bracing link member having a length to hold the handle member in an opened position extending transverse to the sidewall of the pot portion when the projection of the first flexible member is within the upper opening of the first sidewall and the projection of the second flexible member is within the upper opening of the second sidewall, and to hold the handle member in a closed position immediately adjacent to the sidewall of the pot portion when the projection of the first flexible member is within the lower opening of the first sidewall and the projection of the second flexible member is within the lower opening of the second sidewall.

8. The cook-pot of claim 7 wherein the handle member has an inward wall facing toward the sidewall of the pot portion, the inward wall having an elongated handle member opening extending between the upper and lower end portions of the handle member, the bracing link member extending through the elongated handle member opening and into the guide channel wherein the second end of the bracing link member is rotatably attached to the lock member.

9. A foldable handle for a container, comprising:

a bracket attachable to the container;

an elongated non-articulated handle member having an upper end portion pivotally connected to a first portion of the bracket for rotation about a first rotational axis and a lower end portion with a free end disconnected from the container, the handle member having an upper opening located in the upper end portion of the handle member and a lower opening located in the lower end portion of the handle member, the handle member having a longitudinally extending guide channel;

a lock member slidably disposed in the guide channel for movement between the upper and lower end portions of the handle member, the lock member including a resiliently flexible member having a projection for removably fitting within the upper and lower openings of the handle member when in position thereat; and a bracing link member having a first end rotatably retained by a second portion of the bracket located below and spaced apart from the first portion of the bracket for rotation about a second rotational axis located below and spaced apart from the first rotational axis and a second end rotatably attached to the lock member, the bracing link member having a length to hold the handle member in an opened position extending transverse to the container when the projection of the flexible member is within the upper opening of the handle member, and to hold the handle member in a closed position adjacent to the container when the projection of the flexible member is within the lower opening of the handle member.

10. The foldable handle of claim 9 wherein the handle member has an inward wall facing toward the container when the bracket is attached to the container, the inward wall having an elongated handle member opening extending between the upper and lower end portions of the handle member, the bracing link member extending through the elongated handle member opening and into the guide channel wherein the second end of the bracing link member is rotatably attached to the lock member.

11. A foldable handle for a container, comprising:

an elongated handle member having an upper end portion pivotally connectable to a first portion of the container for rotation about a first rotational axis and a lower end portion with a free end disconnected from the container, the handle member having an upper opening located in the upper end portion of the handle member and a lower opening located in the lower end portion of the handle member, the handle member having a longitudinally extending guide channel;

a lock member slidably disposed in the guide channel for movement between the upper and lower end portions of the handle member, the lock member including a resiliently flexible member having a projection for removably fitting within the upper and lower openings of the handle member when in position thereat; and a bracing link member having a first end pivotably connectable to a second portion of the container located below and spaced apart from the first portion of the container for rotation about a second rotational axis located below and spaced apart from the first rotational axis, and a second end rotatably attached to the lock member, the bracing link member having a length to hold the handle member in an opened position extending transverse to the container when the projection of the flexible member is within the upper opening of the handle member, and to hold the handle member in a closed position adjacent to the container when the projection of the flexible member is within the lower opening of the handle member.

12. The foldable handle of claim 11 wherein the handle member has an inward wall facing toward the container when the upper end portion of the handle member is connected to the first portion of the container, the inward wall having an elongated handle member opening extending between the upper and lower end portions of the handle member, the bracing link member extending through the elongated handle member opening and into the guide channel wherein the second end of the bracing link member is rotatably attached to the lock member.

13. A cook-pot, comprising:

a pot portion having a sidewall;

an elongated non-articulated handle member having an upper end portion pivotally connected to a first portion of the sidewall of the pot portion for rotation about a first rotational axis and a lower end portion disconnected from the sidewall of the pot portion, the handle member having an upper opening located in the upper end portion of the handle member and a lower opening located in the lower end portion of the handle member, the handle member having a longitudinally extending guide channel extending between the upper and lower end portions of the handle member;

a lock member slidably disposed in the guide channel for movement between the upper and lower end portions of the handle member, the lock member including a movable member portion for removably fitting within the upper opening of the handle member when in position thereat and within the lower opening of the handle member when in position thereat; and a bracing link member having a first end pivotally connected to a second portion of the sidewall of the pot portion located below and spaced apart from the first portion of the sidewall of the pot portion for rotation about a second rotational axis located below and spaced apart from the first rotational axis, and a second end rotatably attached to the lock member, the bracing link member having a length to hold the handle member in an opened position extending transverse to the sidewall of the pot portion when the movable member is within the upper opening of the handle member, and to hold the handle member in a closed position immediately adjacent to the sidewall of the pot portion when the movable member is within the lower opening of the handle member.

14. The cook-pot of claim 13 further including a bracket attached to the sidewall of the pot portion, and wherein the upper end portion of the handle member is pivotally connected to the first portion of the sidewall of the pot portion by the bracket for rotation about the first rotational axis, and the first end of the bracing link member is pivotally connected to the second portion of the sidewall of the pot portion by the bracket for rotation about the second rotational axis.

15. The cook-pot of claim 13 wherein the handle member has an inward wall facing toward the sidewall of the pot portion, the inward wall having an elongated handle member opening extending between the upper and lower end portions of the handle member, the bracing link member extending through the elongated handle member opening and into the guide channel wherein the second end of the bracing link member is rotatably attached to the lock member.

16. A cook-pot, comprising:

a pot portion having a sidewall;

an elongated handle member having an upper end portion and a lower end portion, the upper end portion being rotatably coupled to a first portion of the sidewall of the port portion for rotation of the handle member relative to the sidewall of the pot portion about a sole handle member first axis of rotation, the lower end portion being disconnected from the sidewall of the pot portion, the handle member having an upper opening located in the upper end portion of the handle member and a lower opening located in the lower end portion of the handle member, the handle member having a longitudinally extending guide channel extending between the upper and lower end portions of the handle member;

a lock member slidably disposed in the guide channel for movement between the upper and lower end portions of the handle member, the lock member including a movable member portion for removably fitting within the upper opening of the handle member when in position thereat and within the lower opening of the handle member when in position thereat; and a bracing link member having a first end pivotally connected to a second portion of the sidewall of the pot portion located below and spaced apart from the first portion of the sidewall of the pot portion for rotation about a second rotational axis located below and spaced apart from the first rotational axis, and a second end rotatably attached to the lock member, the bracing link member having a length to hold the handle member in an opened position extending transverse to the sidewall of the pot portion with the lower end portion of the handle member located at a distance farther away from the sidewall of the port portion than the upper end portion of the handle member when the movable member is within the upper opening of the handle member, and to hold the handle member in a closed position with the upper and lower end portions immediately adjacent to the sidewall of the pot portion when the movable member is within the lower opening of the handle member.

17. The cook-pot of claim 16 further including a bracket attached to the sidewall of the pot portion, and wherein the upper end portion of the handle member is pivotally connected to the first portion of the sidewall of the pot portion by the bracket for rotation about the first rotational axis, and the first end of the bracing link member is pivotally connected to the second portion of the sidewall of the pot portion by the bracket for rotation about the second rotational axis.

18. The cook-pot of claim 16 wherein the handle member has an inward wall facing toward the sidewall of the pot portion, the inward wall having an elongated handle member opening extending between the upper and lower end portions of the handle member, the bracing link member extending through the elongated handle member opening and into the guide channel wherein the second end of the bracing link member is rotatably attached to the lock member.

19. A foldable handle for a cook-pot having a cook-pot sidewall, comprising:

an elongated non-articulated handle member having an upper end portion pivotally connectable to a first portion of the cook-pot sidewall for rotation about a first rotational axis and a lower end portion disconnected from the cook-pot sidewall, the handle member having an upper opening located in the upper end portion of the handle member and a lower opening located in the lower end portion of the handle member, the handle member having a longitudinally extending guide channel extending between the upper and lower end portions of the handle member;

a lock member slidably disposed in the guide channel for movement between the upper and lower end portions of the handle member, the lock member including a movable member portion for removably fitting within the upper opening of the handle member when in position thereat and within the lower opening of the handle member when in position thereat; and a bracing link member having a first end pivotally connectable to a second portion of the cook-pot sidewall located below and spaced apart from the first portion of the cook-pot sidewall for rotation about a second rotational axis located below and spaced apart from the first rotational axis, and a second end rotatably attached to the lock member, the bracing link member having a length to hold the handle member in an opened position extending transverse to the cook-pot sidewall when the movable member is within the upper opening of the handle member, and to hold the handle member in a closed position adjacent to the cook-pot sidewall when the movable member is within the lower opening of the handle member.

20. The foldable handle of claim 19 further including a bracket attachable to the cook-pot sidewall, and wherein the upper end portion of the handle member is pivotally connectable to the first portion of the cook-pot sidewall by the bracket for rotation about the first rotational axis, and the first end of the bracing link member is pivotally connectable to the second portion of the cook-pot sidewall by the bracket for rotation about the second rotational axis.

21. The foldable handle of claim 19 wherein the handle member has an inward wall facing toward the cook-pot sidewall when the upper end portion of the handle member is connected to the first portion of the cook-pot sidewall, the inward wall having an elongated handle member opening extending between the upper and lower end portions of the handle member, the bracing link member extending through the elongated handle member opening and into the guide channel wherein the second end of the bracing link member is rotatably attached to the lock member.

22. A foldable handle for a cook-pot having a cook-pot sidewall, comprising:

an elongated handle member having an upper end portion and a lower end portion, the upper end portion being rotatably couplable to a first portion of the cook-pot sidewall for rotation of the handle member relative to the cook-pot sidewall about a sole handle member first axis of rotation, the lower end portion being disconnected from the cook-pot sidewall, the handle member having an upper opening located in the upper end portion of the handle member and a lower opening located in the lower end portion of the handle member, the handle member having a longitudinally extending guide channel extending between the upper and lower end portions of the handle member;

a lock member slidably disposed in the guide channel for movement between the upper and lower end portions of the handle member, the lock member including a movable member portion for removably fitting within the upper opening of the handle member when in position thereat and within the lower opening of the handle member when in position thereat; and a bracing link member having a first end pivotally connectable to a second portion of the cook-pot sidewall located below and spaced apart from the first portion of the cook-pot sidewall for rotation about a second rotational axis located below and spaced apart from the first rotational axis, and a second end rotatably attached to the lock member, the bracing link member having a length to hold the handle member in an opened position extending transverse to the cook-pot sidewall with the lower end portion of the handle member located at a distance farther away from the cook-pot sidewall than the upper end portion of the handle member when the movable member is within the upper opening of the handle member, and to hold the handle member in a closed position with the upper and lower end portions adjacent to the cook-pot sidewall when the movable member is within the lower opening of the handle member.

23. The foldable handle of claim 22 further including a bracket attachable to the cook-pot sidewall, and wherein the upper end portion of the handle member is pivotally connectable to the first portion of the cook-pot sidewall by the bracket for rotation about the first rotational axis, and the first end of the bracing link member is pivotally connectable to the second portion of the cook-pot sidewall by the bracket for rotation about the second rotational axis.

24. The foldable handle of claim 22 wherein the handle member has an inward wall facing toward the cook-pot sidewall when the upper end of the handle member is coupled to the first portion of the cook-pot sidewall, the inward wall having an elongated handle member opening extending between the upper and lower end portions of the handle member, the bracing link member extending through the elongated handle member opening and into the guide channel wherein the second end of the bracing link member is rotatably attached to the lock member.

* * * * *